United States Patent [19] [11] 4,264,762
Cordes et al. [45] Apr. 28, 1981

[54] GLASS-CLEAR NYLONS FROM 3,3'-DIMETHYL PACM

[75] Inventors: Claus Cordes, Weisenheim; Richard Pflueger, Ludwigshafen; Franz Schmidt, Mannheim; Georg N. Simon, Limburgerhof, all of Fed. Rep. of Germany

[73] Assignee: BASF Aktiengesellschaft, Fed. Rep. of Germany

[21] Appl. No.: 85,963

[22] Filed: Oct. 18, 1979

[30] Foreign Application Priority Data

Oct. 24, 1978 [DE] Fed. Rep. of Germany ....... 2846226

[51] Int. Cl.³ .............................................. C08G 69/26
[52] U.S. Cl. .................................... 528/338; 528/339; 528/340; 528/346; 528/347; 528/349
[58] Field of Search ................ 528/346, 349, 340, 338

[56] References Cited

U.S. PATENT DOCUMENTS

| 2,696,482 | 12/1954 | Pease | 528/346 |
| 3,597,400 | 8/1971 | Kashiro et al. | 528/338 |
| 4,060,517 | 11/1971 | Mertes et al. | 528/336 |

FOREIGN PATENT DOCUMENTS 619707 3/1949 United Kingdom .
1548431 7/1979 United Kingdom .

Primary Examiner—Harold D. Anderson
Attorney, Agent, or Firm—Keil & Witherspoon

[57] ABSTRACT

A glass-clear nylon based on aromatic dicarboxylic acids and dialicyclic diamines is prepared by polycondensing isophthalic acid with a mixture of 3,3'-dimethyl-4,4'-diamino-dicyclohexylmethane and hexamethylenediamine.

The nylons may be used for the production of moldings, especially by injection-molding.

1 Claim, No Drawings

GLASS-CLEAR NYLONS FROM 3,3'-DIMETHYL PACM

The present invention relates to glass-clear nylons based on aromatic dicarboxylic acids and dialicyclic diamines.

British Pat. No. 619,707 describes transparent nylons obtained from dialicyclic diamines and, preferably, aliphatic dicarboxylic acids. Such products are not dimensionally stable at above 100° C.

U.S. Pat. No. 2,696,482 therefore proposes using isophthalic acid as the dicarboxylic acid. However, the nylons thus obtained have too high a melt viscosity, so that they are difficult to process.

U.S. Pat. No. 3,597,400 describes transparent nylons consisting of terephthalic acid and isophthalic acid, on the one hand, and bis-(4-aminocyclohexyl)-methane and hexamethylenediamine, on the other. These products have a low softening point and unsatisfactory impact strength.

Finally, British Pat. No. 1,548,431 discloses glass-clear nylons which are prepared by polycondensing 3,3'-dimethyl-4,4'-diamino-dicyclohexylmethane, isophthalic acid and lauryl-lactam. The mixture of the starting materials has a very low solubility in water, so that when the process is carried out industrially, and in particular continuously, large amounts of water must be evaporated.

It is an object of the present invention to provide glass-clear nylons which exhibit good processability, high glass transition temperatures and excellent toughness, hardness and rigidity. It is a further object of the invention to synthesize such nylons from readily obtainable starting materials and to provide a process for the preparation of the nylons which is also simple to carry out continuously.

We have found that these objects are achieved with polycondensates which consist of A. 70–100 mole % of isophthalic acid and
  30–0 mole % of other dicarboxylic acids of 5 to 12 carbon atoms, and
B. 20–60 mole % of 3,3'-dimethyl-4,4'-diaminodicyclohexylmethane and
  80–40 mole % of hexamethylenediamine.

The mixture of starting materials used to prepare the glass-clear nylons of the invention is readily water-soluble. Accordingly, it is possible to obtain high solids contents so that only little energy need be expended on evaporation of water. The starting materials present no problems in respect of conveying and metering, which is particularly important if the polycondensation is carried out continuously. Finally, the ratios of the starting materials can conveniently be regulated with the aid of pH measurements.

The nylons according to the invention are polycondensates of 3,3'-dimethyl-4,4'-diaminodicyclohexylmethane and hexamethylenediamine, on the one hand, and, on the other, isophthalic acid, which may be partly replaced by other dicarboxylic acids. Suitable dicarboxylic acids for such replacement are, in particular, aromatic or aliphatic dicarboxylic acids of 5–12 carbon atoms, preferably adipic acid or terephthalic acid. The mixture of the diamines contains 20–60 mole %, preferably 25–50 mole %, of dimethyldicyan. If too much or too little of this diamine is employed, a nylon having too high a melt viscosity is obtained, leading to processing difficulties.

The polycondensation is carried out by methods, and under conditions, conventionally used for the preparation of nylon 6,6. The dicarboxylic acids and diamines are employed in about equivalent amounts; the deliberate use of a small excess of either can be used to vary the chain length of the nylon. Small amounts of monocarboxylic acids or monoamines may also be added for the latter purpose. The polycondensation is carried out in aqueous solution at a solids content of, preferably, from 50 to 75% by weight; the preferred reaction temperature is from 220° to 270° C. and the pressure from 10 to 40 bar. The polycondensation is preferably carried out continuously, the principle of such a method being described, for example, in U.S. Pat. No. 4,060,517.

Before, during or after the polycondensation, the conventional additives, eg. stabilizers, dyes, plasticizers, flameproofing agents and reinforcing agents, may be added to the nylon.

In the Examples, parts and percentages are by weight.

EXAMPLE 1

A solution of 24.5 kg of water, 12.94 kg of bis-4,4'-diamino-3,3'-dimethyldicyclohexylmethane and 14.36 kg of hexamethylenediamine was prepared in a stirred kettle. 29.27 kg of isophthalic acid were then added and dissolved at 90° C. 100 g of 50% strength $H_3PO_3$ were added to the clear solution and the pH was brought to 8.

15 kg of the above solution were introduced into an autoclave equipped with a stirrer, raised to 270° C. and condensed at this temperature for one hour under a pressure of 20 bar. The pressure was then released and the nylon was extruded into a waterbath under $N_2$ pressure, solidified and granulated.

The nylon obtained had an intrinsic viscosity of 95 (measured on an 0.5% strength solution in sulfuric acid), a glass transition temperature of 175° C. (measured by means of a Perkin Elmer Differential Scanning Calorimeter 1), a notched impact strength (at 23° C. and 50% relative humidity, measured according to DIN 53,753 (draft)) of 25.4 kJ/m$^2$ and a tensile strength of 90 N/mm$^2$ (measured according to DIN 53,455).

EXAMPLE 2

The following starting materials were introduced into a 40 liter stirred autoclave: 6.65 kg of $H_2O$, 4.503 kg of isophthalic acid, 2.587 kg of 4,4'-diamino-3,3'-dimethyl-dicyclohexylmethane, 1.891 kg of hexamethylenediamine and 2.320 kg of AH salt (consisting of adipic acid and hexamethylenediamine in the ratio of 1:1). The contents of the autoclave were heated to 270° C. and condensation was carried out under a pressure of 20 bar for 1 hour, after which the pressure was released, condensation was continued for 2 hours at 280° C., and the product was extruded by means of $N_2$ pressure. After granulation, the product was condensed further in the solid state, the intrinsic viscosity IV thereby being raised from 90 to 100.

The glass-clear nylon obtained had the following properties: glass transition temperature 159° (Differential Scanning Calorimeter), notched impact strength 55 kJ/m$^2$ at 23° and 50% relative atmospheric humidity, tensile strength 70 N/mm$^2$ (the test methods used for the impact strength and tensile strength were the same as in Example 1).

EXAMPLE 3

10.2 kg of hexamethylenediamine and 22.65 kg of 4,4'-diamino-3,3'-dimethyldicyclohexylmethane were introduced into 33 liters of water in a stirred kettle, 29.96 kg of isophthalic acid and 16.23 kg of AH salt were then added, and all was dissolved at 90° C. (pH 8.1). The solution obtained remainded clear even at 60° C. An experiment whereby the solution was circulated, at 90° C., by pumping with a piston metering pump showed no change in the consistency of the solution after 8 hours and no blockage of the pump parts by crystals.

The solution was condensed in a 150 liter stirred autoclave for 2 hours at 270° C. and 20 bar, the pressure was slowly released, condensation was continued for 30 minutes in a stream of $N_2$, and the product was extruded under $N_2$ pressure and granulated.

The glass-clear nylon (intrinsic viscosity 101) had a glass transition temperature of 165° C., a notched impact strength of 56.7 $kJ/m^2$ (23° C. and 50% relative atmospheric humidity) and a tensile strength of 77 $N/mm^2$.

We claim:

1. A glass-clear nylon based on aromatic dicarboxylic acids and dialicyclic diamines, which is a polycondensate of
   A. 70–100 mole % of isophthalic acid and
      30–0 mole % of adipic acid, and
   B. 20–60 mole % of 3,3'-dimethyl-4,4'-diaminodicyclohexylmethane and
      80–40 mole % of hexamethylenediamine.

* * * * *